Aug. 28, 1928.
W. C. HOLLISTER ET AL
MEANS AND METHOD FOR PRODUCING VERTICALLY RULED PRINTING FORMS
Filed March 7, 1925  8 Sheets-Sheet 4
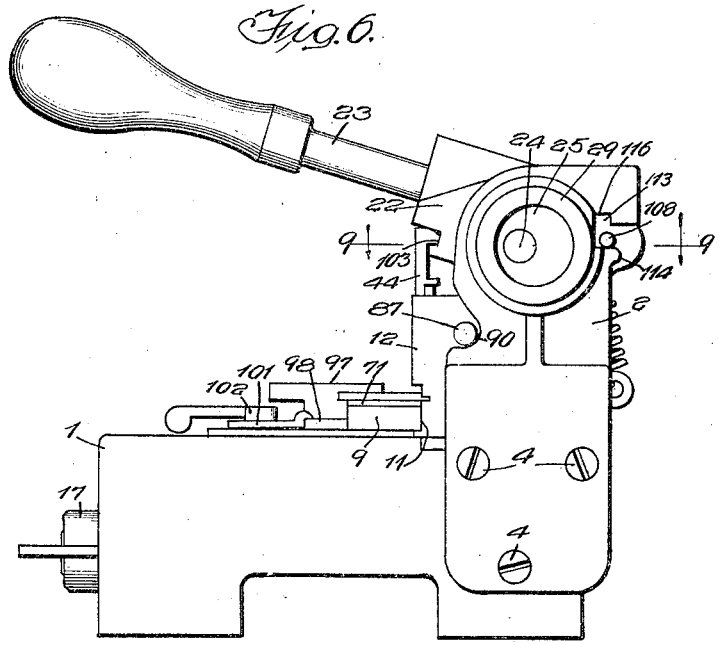
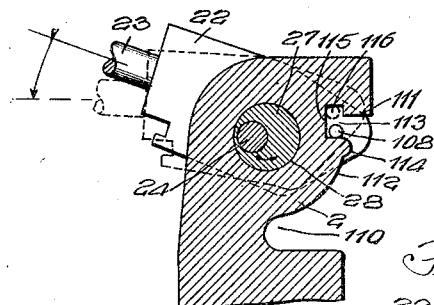
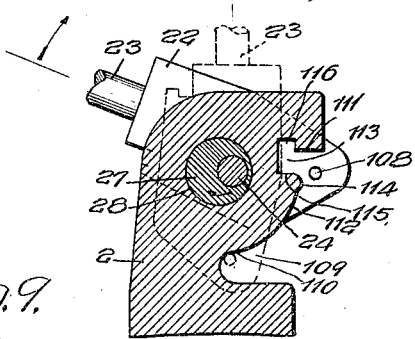
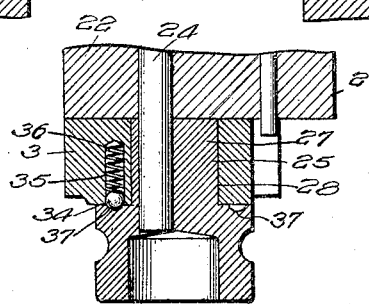
Inventors
William C. Hollister
Leo M. Chapman
Edward Fay Wilson

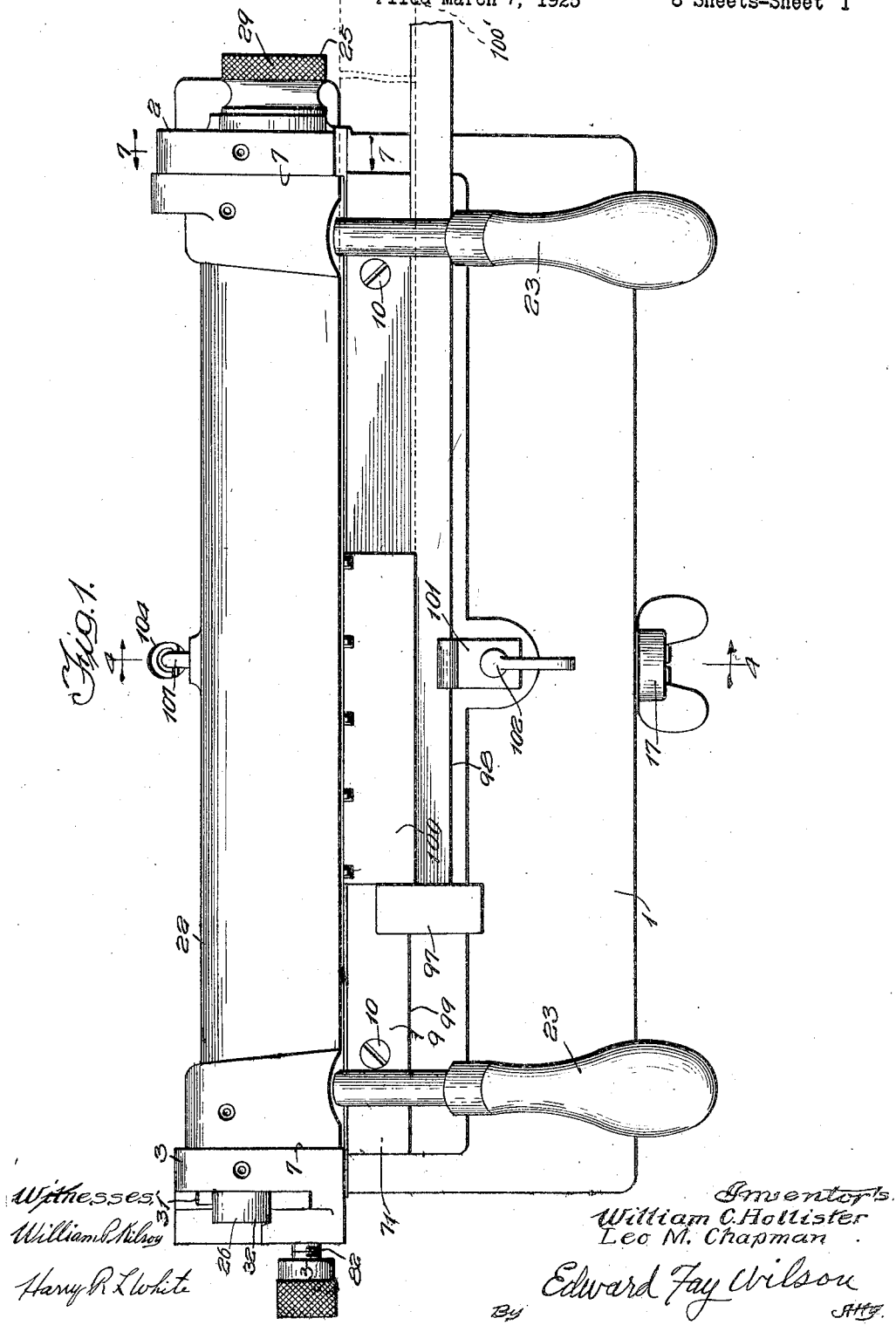

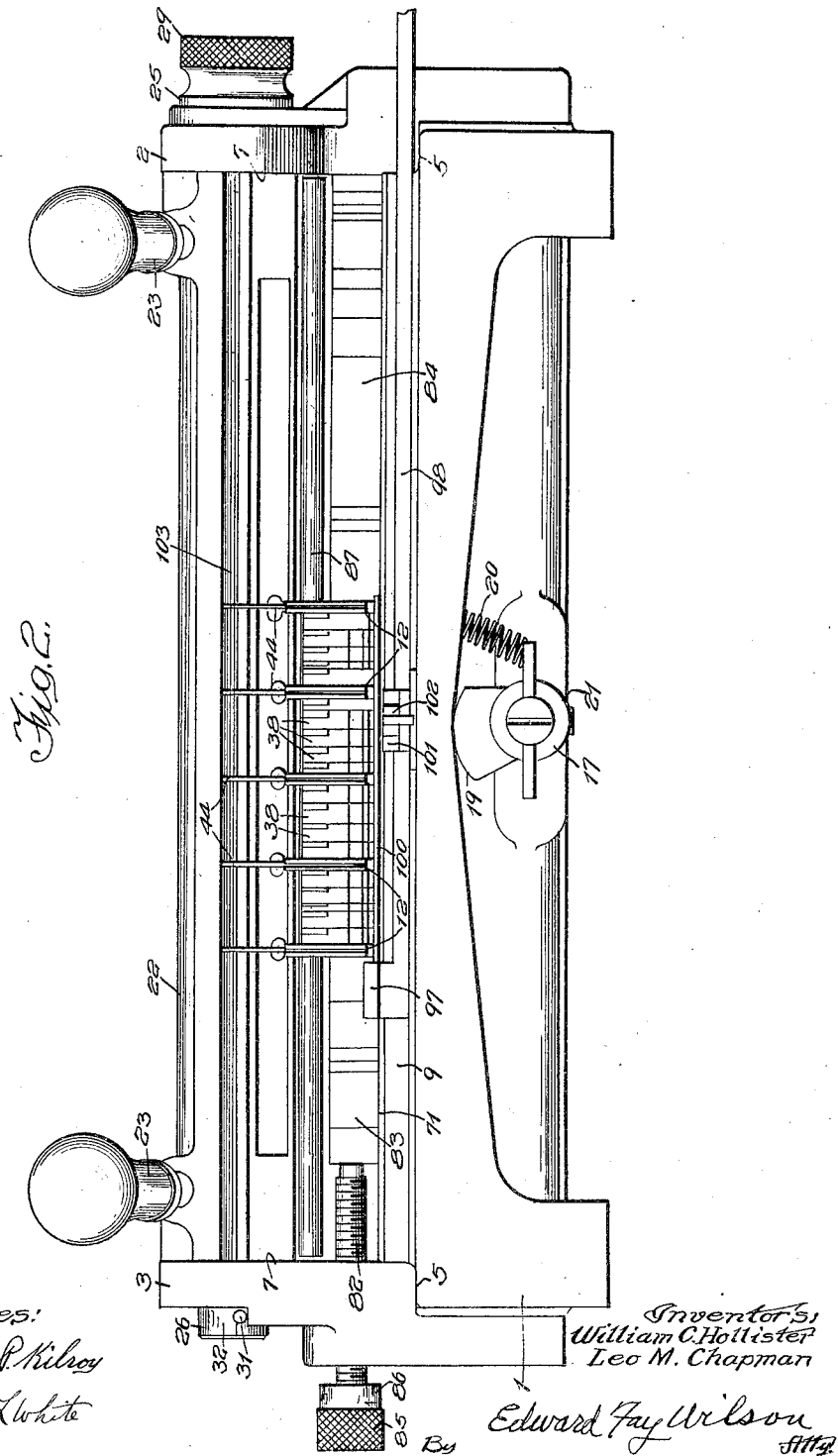

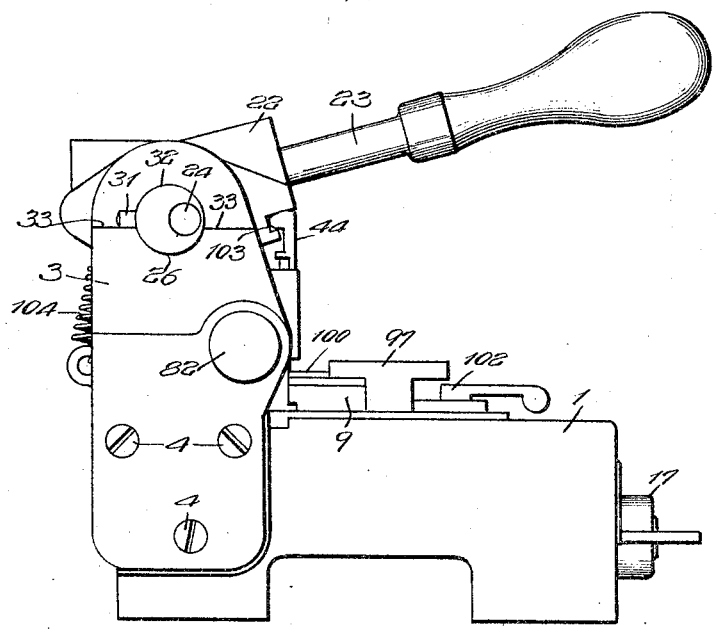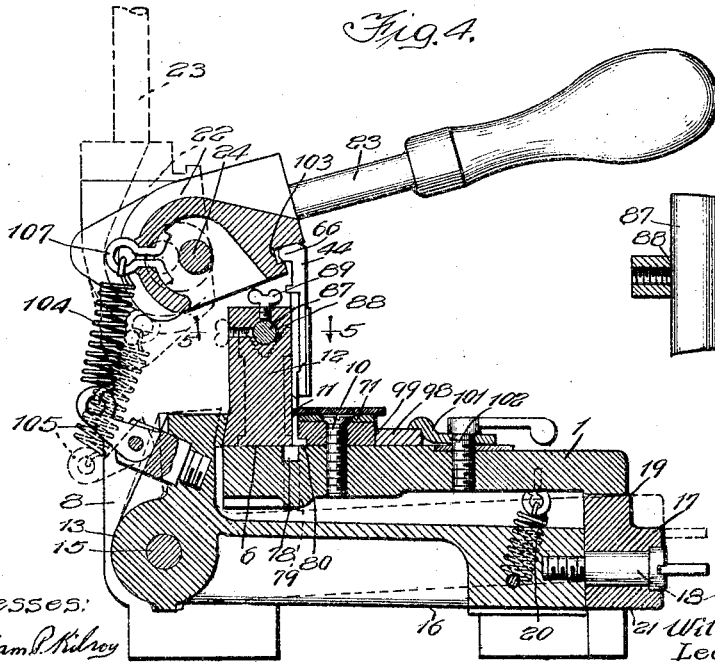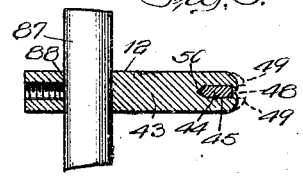

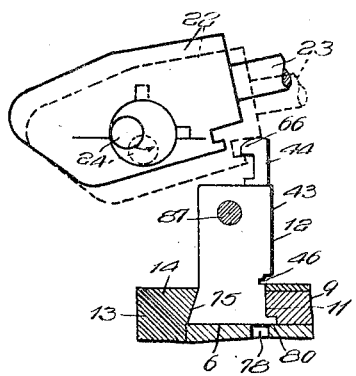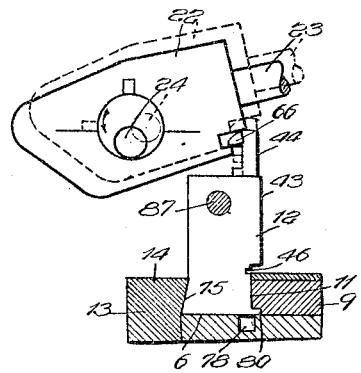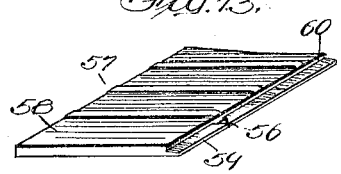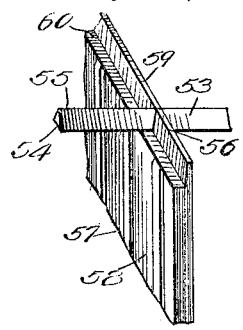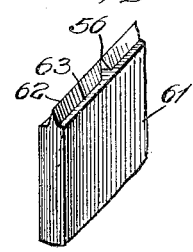

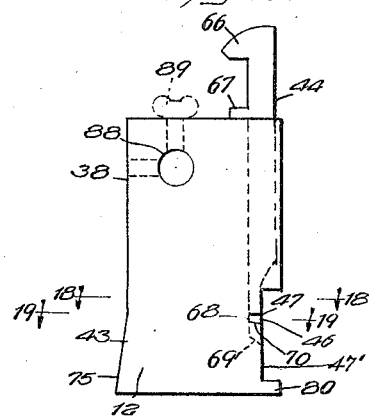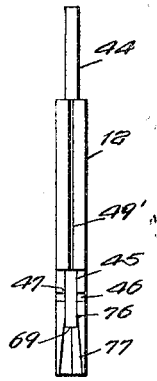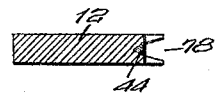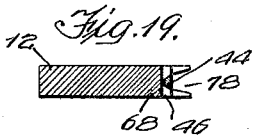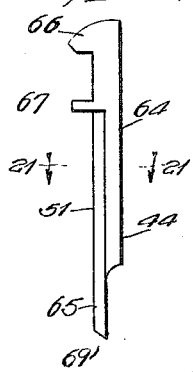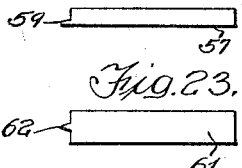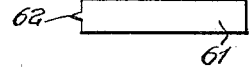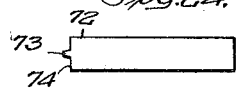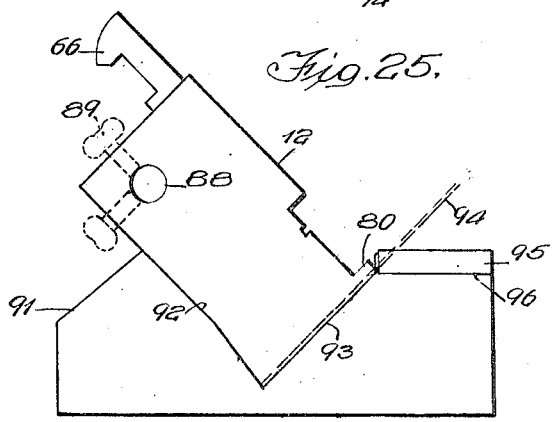

Aug. 28, 1928.  
W. C. HOLLISTER ET AL  
1,682,514  
MEANS AND METHOD FOR PRODUCING VERTICALLY RULED PRINTING FORMS  
Filed March 7, 1925   8 Sheets-Sheet 7
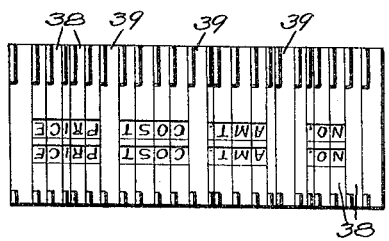
Fig. 26.
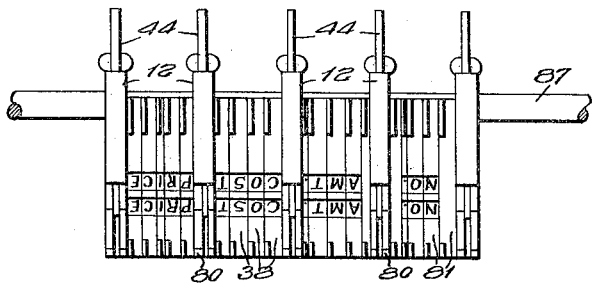
Fig. 27.
Fig. 28.
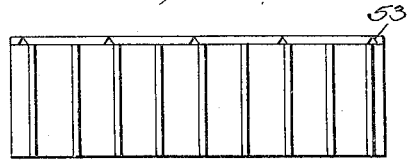
Fig. 29.
Witnesses:  
William P. Kilroy  
Harry R L White
Inventors:  
William C. Hollister  
Leo. M. Chapman  
By Edward Fay Wilson  
Atty.

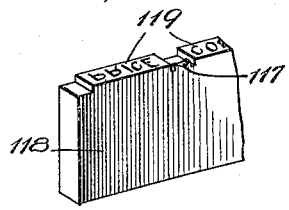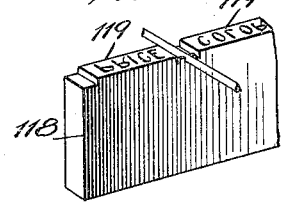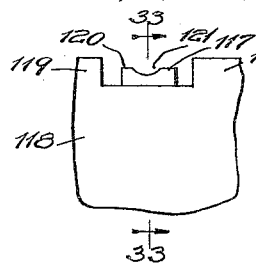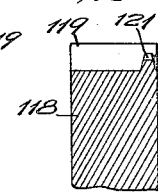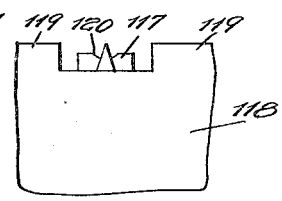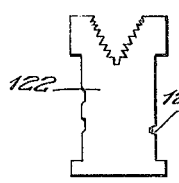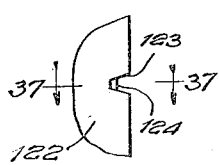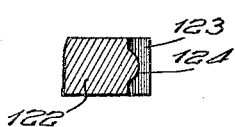

Patented Aug. 28, 1928.

1,682,514

UNITED STATES PATENT OFFICE.

WILLIAM C. HOLLISTER AND LEO M. CHAPMAN, OF CHICAGO, ILLINOIS, ASSIGNORS TO CHICAGO LINO-TABLER COMPANY, OF CHICAGO, ILLINOIS, A CORPORATION OF ILLINOIS.

MEANS AND METHOD FOR PRODUCING VERTICALLY-RULED PRINTING FORMS.

Application filed March 7, 1925. Serial No. 13,734.

Our invention relates to improvements in methods and means for producing ruled printing forms and has special reference to improved means and methods for producing suitably spaced openings in printing or non-printing rules or members for properly holding and spacing what are called vertical rules in tabular matter, especially where the form is made up of line printing members or type slugs.

As horizontal ruling members are commonly made for interposition between printing strips or slugs, they are type high and usually, if they are thicker than two points, they have a shoulder which is .043 of an inch below the top of the printing surface. Rising above this shoulder is a V-shaped printing part, and in the method herein involved this upper part is perforated by V-shaped openings having overhanging side walls for receiving and retaining vertical ruling members of a similar triangular shaped cross-section. This present invention has to do with the production of these rule receiving openings, a number at a time and in properly spaced relation to match or register with the tabular matter being composed.

Many features of importance relate to structural and adjustment means by which we are enabled to readily assemble a series of independent punches in a desired relation, and to simultaneously operate the punches, also to set a horizontal rule or dash slug in relation to the assembled punches for operation thereon. Other features relate to the construction and manipulation of the individual punch units, the construction of the machine for the convenient assembly therein of the punches and their simultaneous and proper manipulation.

We have also devised a simple means of spacing the individual punch units in the machine for producing properly spaced rule holding openings in cross or horizontal dash slugs to properly cooperate with the prepared printing type slugs.

Further features of importance will be made plain from the following specification and claims taken in conjunction with the accompanying drawings, forming part of this specificaton and in which:—

Figure 1, is a top plan view of a slug punching machine made in accordance with our invention;

Figure 2, is a front elevation of the machine;

Figure 3, is an end view taken from the left hand end of Figure 2;

Figure 4, is a vertical transverse section on the line 4—4 of Figure 1;

Figure 5, is a detail horizontal sectional view of one of the punch units on the line 5—5 of Figure 4;

Figure 6, is an end view from the right hand end;

Figure 7, is a detail vertical section on the line 7—7 of Figure 1;

Figure 8, is a sectional view similar to Figure 7, showing a different position of some of the parts;

Figure 9, is a fragmentary, horizontal, sectional view on the line 9—9 of Figure 6;

Figure 10, is a diagrammatic view, partly in vertical section and illustrating some of the movements of the punch operator;

Figure 11, is a view similar to Figure 10, illustrating other movements of the punch operator;

Figure 12, is a fragmentary plan view of a printed sheet, showing a table such as is produced by the product of the machine;

Figure 13, is a fragmentary perspective view of one of the punched rules;

Figure 14, is a fragmentary perspective view, showing a line printing rule similar to that shown in Figure 13, with a piece of vertical rule in one of the notches thereof.

Figure 15, is a fragmentary perspective view of a different form of rule provided with vertical rule receiving openings;

Figure 16, is a side view of one of the punch units;

Figure 17, is a front view of one of the punch units;

Figures 18 and 19, are horizontal sections of the punch unit on the line 18—18 and 19—19, respectively, of Figure 16;

Figure 20, is a side elevation of one of the punches;

Figure 21, is a transverse section of one of the punches on the line 21—21 of Figure 20;

Figures 22, 23 and 24, are respectively similar end views of three forms of rule holding slugs or type form members;

Figure 25, illustrates another method of setting a series of the punch units, in this instance to register properly with a prepared slug or any other prepared scale or sample indicating the proper spacing of the punch units;

Figure 26, is a view in elevation of a series of matrices used to produce a printing slug for tabular work;

Figure 27, is a similar view of the matrices, except that the blank matrices have been removed and punch units substituted therefor;

Figure 28, is a fragmentary, plan view of a type form, such as would be built up by the assistance of our system;

Figure 29, is an end view of the type form shown in Figure 28;

Figure 30, is a fragmentary, perspective view of a printing slug provided with rule holding projections;

Figure 31, is a view similar to Figure 30, showing the projection perforated and a piece of rule therein;

Figure 32, is an enlarged fragmentary, side elevation of the slug shown in Figure 30;

Figure 33, is a vertical section on the line 33—33 of Figure 32;

Figure 34, is a view similar to Figure 32 but showing the projection perforated and a rule held therein;

Figure 35, is a side elevation of a matrix for use in a line casting machine and provided with a notch adapted to produce the form of rule holding projection shown in Figure 34;

Figure 36, is an enlarged, fragmentary, side elevation of the matrix in Figure 35, and particularly showing the projection forming notch; and Figure 37, is a detail, horizontal, sectional view on the line 37—37 of Figure 36.

In said drawings 1 illustrates a rectangular base to which upwardly projecting posts 2 and 3 are rigidly secured, one at each end, and adjacent to the rear edge of the base. These posts are secured by screws 4. The upper parts of these posts are offset inwardly, as shown at 5, and rest at these points upon a finished top surface 6 of the base. The opposed faces 7 of these posts are vertical and parallel with each other and are coincident with similar surfaces 8 on the base 1 beneath the posts 2 and 3. Between the opposed surfaces 7—7 and 8—8 the various operating parts of the machine are mounted.

The top surface 6 of the base forms a table or surface upon which the punch units can be placed and held in alignment, and said surface 6 extends from end to end of the machine. This surface 6 is defined at its front edge by a fixed longitudinal shoulder member 9, secured to the base 1 by screws 10 and having a rear edge 11 against which the punch units 12 are clamped to hold them in perfect alignment during the punching operations.

For thus clamping the punching units we provide a clamping member 13, having a longitudinal jaw 14 opposed to the clamping member 9. The member 13 is pivotally mounted at its ends between the surfaces 8 upon pivots 15 to swing back and forth so as to move the jaw 14 from and toward the opposite member 9 to release and clamp the punch units 12. For swinging the member 13 we provide it with arm 16 which extends forwardly beneath the top of the base and carries on its forward end a cam member 17 mounted on a horizontal bearing pin 18 secured rigidly in the free end of the arm 16. The cam member 17 is rotatable on the pin 18 and has an eccentric cam surface 19 which can be turned into engagement with the under surface of the top of the base 1 to depress the free end of the arm 16 and cause the clamping jaw 14 to swing toward the opposite clamping member 9. Normally the clamping jaws are held separated by a tension spring 20 connected at its lower end to the arm 16 and at its upper end to the base 1. The cam member 17 is cut away on the side opposite to the cam part 19, as shown at 21, to permit the arm to rise sufficiently to cause the proper spreading of the jaws 9 and 14.

Between the surfaces 7 of the posts 2 and 3 a second longitudinal member 22 is arranged and extending from post to post. This member is the punch operator and is mounted to swing on a horizontal axis, its front part being adapted to swing up and down to operate the punches, it is provided with forwardly extending rigidly projecting handles or lever arms 23, one at each end, by which it can be easily operated. The operator is mounted on a bearing rod 24 which extends through the posts 2 and 3 and the ends of which are supported in bearing members 25 at one end 26 at the other end, which have inner bearing ends 27 rotatably mounted in bearing openings 28 provided in the posts 2 and 3. The ends of the rod 24 are eccentrically mounted in the bearing members, as shown in the several figures, and are rigidly connected thereto to rotate therewith. One of said bearing members 25 is provided on its outer end with a knurled head 29 by which the bearing members and the rod 24 can be rotated. The rotation of the rod 24 is limited to 180° by a pin 31 rigidly projecting from the outer end 32 of the bearing member 26 and which contacts with suitable stops 33 on the post 3. By rotating the rod 24 with its eccentric bearing members 25 and 26 the operator 22 is moved bodily back and forth; this is for engaging and disengaging the punches, as will be more fully described hereinafter.

While the stops 33 prevent the rod being rotated too far in either direction, we provide accurate setting means for the members 25—26. This consists of a ball 34 and a spring 35 carried in an opening 36 provided in the post 3 which carries the bearing member 25, and the bearing member is provided with two ball receiving depressions 37 into which the ball is forced by the spring. These depressions are accurately placed to properly set the rotatable member comprising the rod 24 and the eccentric bearing members. The operator 22 is rotatably mounted on the rod 24 and can swing up and down with the bearing members in either limiting position. When the operator is moved forward it is in punch operating position, and when moved back it is free of the punches and can be swung up so that the handles extend substantially vertically, as shown in dotted lines in Figure 8.

On many type slug casting machines of which the well known lino-type machine is typical in the making of printing slugs for tabular matter, a series of letter or figure forming matrices 38 are assembled with what are called blank matrices 39 properly interspersed, so that when the slug 40 is cast it will have proper letter or figure forming projections 41 separated by blank spaces or surfaces 42. These blank matrices can be of uniform thickness and we preferably make the punch units 12, which each comprise a suitable punch carrier or housing 43 and a punch member 44, of equal thickness with the blank matrices so that, as shown in Figures 26 and 27, the punch units 12 can be substituted for the blank matrices in the assembled line of matrices, and the housings will be spaced in accordance with the spacing of the blank matrices 39. Each housing 43 has a lower end which fits between the fixed abutment 11 and the clamping member 14, and at the forward edge of the housing it is provided with a longitudinal guide opening 45 for containing the punch 44. The punch unit is of a height to seat upon the flat surface 6 of the base, and at the height of the top surface of the guide bar 9 it is provided with a notch 46 which is equal in depth to the usual height of printing characters on lino-type slugs, such as the projections 41, above the blank spaces 42, viz, 43 thousandths of an inch. Above this notch the front edge of the housing projects forward to form a shoulder or surface 47 which is exactly .043 of an inch above the bottom of the notch 46. This surface 47 extends up along the housing a short distance, and above this point the housing projects still further forward to provide the punch guide opening 45.

Preferably the punch carrier is made from a single piece of metal of uniform thickness and, as indicated in Figure 5, the guide opening for the punch is made by first milling a slot 48 of the right shape to receive and guide the punch and deep enough so that the free edges 49 at the sides of the slot can be formed in toward each other, as shown in full lines, Figure 5, to close the front edge of the slot and complete the guide opening 45. The bottom 50 of the slot is V-shaped to receive the V-shaped rear edge 51 of the punch 44.

The rules 53, as shown in Figure 14, which are designed to be inserted into and held in the openings produced by the punches 44, are triangular in cross-section, having a flat base 54 and a more or less sharp top printing edge 55, depending on the kind of line, that is to be printed. These rules are .043 of an inch in height and are adapted to rest on the blank tops of lino-type and similar slugs with their printing edges 55 in the top printing plane of the type form, as best indicated in Figure 29. The punches are formed to produce the triangular openings in the upper edges of ruling members for receiving these rules.

Printing rules are of several kinds as to shape, size, etc., and we have illustrated two typical forms. One form, as shown in Figure 13 at 57, has a relatively thin body 58 and also a relatively thin printing portion 59 along one side of its upper edge. The portion 59 rises from a flat top surface 60 which is .043 of an inch below the printing surface and is coincident as to height with the blank surfaces 42 on the printing slugs, and the bottoms of the rule openings 56 are coincident with this surface 60. The rule 57 has the printing strip 59 arranged coincident with one flat side of the rule and usually constitutes what is known as a hair line rule. The other typical rule 61, shown in Figure 15, has a printing rib 62 arranged substantially along the center of the flat top 63 of the rule instead of along one edge. Our machine is arranged for punching the rule receiving openings 56 in both these styles of rules and for properly gauging the depths of these openings from the printing faces of the rules.

The punches 44 are each formed of a flat strip of metal, preferably equal in thickness to the width of the base of the V-shaped edge 51 and preferably about three times the height of said V-shaped edge portion in width, provided with a body portion 64 extending longitudinally of the V-shaped edge. The body portion is cut away at the lower end, leaving the lower end 65 of the V-shaped edge projecting freely to serve as the punch proper. The upper end of the punch member projects above the housing and is provided with a rearwardly extending projection 66 adapted for engagement by the punch operator 22 and below this projection with a stop projection 67 adapted to contact with the upper end of the housing 12 and limit the downward movement of the punch. The particular function of the stop 67 is to hold the several punches with their projections 66 in horizontal alignment when the punches are free of the operator, so that the operator can be engaged with them in a manner to be described. The edge of the V-shaped punch is coincident with the bottom surface 68 of the notch 46, and the bottom surface 69 of the V-shaped punch end is coincident with the surface 47 of the housing. The lower end or surface 70 of the notch 46 is on a slight incline, approximating somewhat the inclination of the ribs 59 and 62 on the ruling members 57 and 61. The top of the rule support 9 which extends along in front of the punches and upon which the ruling members are laid for punching is on the level of the forward edge of the lower end 70 of the notch 46, so that a ruling member laid flat on this support is in position to be pushed forward to cause its top rib to be projected into the notches 46. When ruling members like those shown at 57 are to be punched they are pushed into the notches 46 until their printing edges contact with the bottoms 68 of the notches 46, thus properly aligning the rules for punching. For arranging the device to punch rules like that shown in Figure 15, that is, rules in which the rib is not coincident with one side of the rule, there is provided a removable top strip 71 on the rule support 9 which can be taken off, thus providing a lower supporting surface for the slug which has the rule holding projection set in from a side face and causing the projection or rib 62 to properly register with the notches 46.

In order that a punch may be enabled to cut a hole in a member being punched it is necessary that a die opening be provided, into which the cutting end of the punch is projected in the punching operation. The production of the relatively small die openings for use in producing the small triangular openings, for the vertical rules 53, has been a problem, and it is almost an impossibility to produce such openings in the solid metal. We have succeeded in simplifying the production of such die openings by the following simple construction. The front edge 43 of the punch holder, below the notch 46, terminates in a vertical flat surface 47' coincident with the front surface 47 above the notch 46 and also coincident with base of the triangular punch end 65, and in clamping the punch units in place in the machine this surface 47' is clamped tightly against the rear edge of the supporting strip 9. The strip 9 therefore forms the third side of the triangular die opening. It is relatively easy to cut the V-groove in the die holder in which the punch fits and operates, as this is done with a suitable milling cutter, and when this notch is closed by the supporting strip 9 the die opening is completed and all the corners of the opening can thus readily and cheaply be made perfect.

In making up some tabular forms rule holding members 72 similar to the member 61 are made use of which have ribs 73 which do not rise to the printing surface, such a member is shown in Figure 24. In punching this form the top flat surface 74 of the member which is .043 of an inch below the printing surface of a printing form is used to properly set the member for punching. The member is pushed in until this surface 74 contacts with the surface 47 of the punch, then as before the punches are operated and the notches cut. Any number of the punch units 12 can be arranged in the machine between the posts 2 and 3. They are set upright on the supporting surface 6 and are clamped tightly against the rear edge 11 of the plate or bar 9 by the clamping member 13. The lower end of the rear edge of each housing is inclined outwardly, as shown at 75, Figure 16, and the engaging surface of the clamp member 13 is likewise inclined so that the action of the clamping member will be to force the housings downwardly upon the surface 6 and forwardly against the surface 11 for holding the housings accurately in position. Below the notch 46 each housing is provided with an extension 76 of the V-shaped opening or groove for receiving the point of the punch as it descends to the lower limit of its movement and below this point, as shown at 77, the groove or opening is flared out to afford ample clearance for the chips cut out by the punch, and the frame is provided with a longitudinal chip groove 78 and clearing holes 79 may be provided through the base at intervals through which the chips can fall out of the machine.

At the lower end of the forward edge of the housings, each is provided with a forwardly projecting toe 80 which is adapted to enter a groove provided under the adjacent edge of the rule support 9; this is for the purpose of preventing the housings being inadvertently pulled up even if the clamping member 13 should not be clamped tight. This groove is less in height than the toes 81 as ordinarily made on lino-type matrices 38 for a purpose to be described later. As well illustrated in the drawings the punch units can be placed in any desired spacing in the machine and we arrange the operator 22 so as to be readily engaged with them and to be disengaged from them and swing out of the way to permit of their being placed in and removed from the machine and arranged in any desired relation.

When the punches are not engaged by the operator 22 they naturally drop down until the stop projections 67 on the punches rest on the tops of the housings, in which position each punch is at the lower limit of its movement and this is the position of each of the punches before the punch operator is brought into engagement with the punches.

As shown in Figure 1, and as has been described, the punch units may be spaced by the matrices which were used in producing the printing slug with which it is desired to use some rule holding members, or obviously they can be spaced in many other ways to correspond with the tabular work which it is desired to produce. The punch units having been substituted for the blank matrices, as shown in Figure 27, the matrices and punch units as an entity can be placed in the machine and clamped in position. In this use it is usually advisable, though not necessary, to clamp the series of matrices and punch units together longitudinally of the machine. For this purpose we provide an adjustable screw 82 projecting through the post 3 and in alignment with the punch units and blocks 83 and 84 may be used to fill in between the post 2, the screw 82 and the series of matrices and punch units in an obvious manner. The head 85 of the screw 82 is provided with circumferential indications 86 for a purpose to be described.

Instead of making use of the matrices to space the punch units in the machine they may be used merely to space the units and then other means may be employed to retain the units in this spaced relation while being transferred into the machine. This other means may consist of a rod 87, the several housings being each provided with an opening 88 for this rod so that, as shown in Figure 27, the several housings can be strung along on the rod, or if the housings are already spaced, as by the matrices, the rod can be pushed through the several housings. Each housing is provided with a set screw 89, preferably at its upper end for binding the housing to the rod. As indicated in the drawings, the set screw 89 may also be arranged at the rear edge of the housing. It is to be noted that the rod 87 is so placed that it is free of the matrices passing through the upper V-shaped openings thereof. Preferably the rod 87 is long enough to reach from post to post of the machine, and we may provide an opening or notch 90 in the forward part of the post 2 through which the rod could be entered or withdrawn. This is for convenience in making changes in the punch units without the necessity of removing them all from the machine.

We have illustrated other convenient ways of spacing the punches on the rod 87. We may provide a trough member 91 (Figure 25), having an inclined right angled trough 92 for receiving the punch units. The bottom ends of the punch units are placed against the side 93 of the trough. If the guide for setting the punches consists of a printed sheet having lines on it to be reproduced by the triangular rules, the sheet may be placed against the wall 93 in proper position and the punch units set in the trough properly centered upon the lines on the paper which is indicated at 94. Should it be desired to register the units with a preformed printing slug having blanks between figure or letter characters, the slug, as shown at 95, may be laid on top of the wall 96 of the trough 91 and the units spaced to register therewith. In either case the units are secured to the rod 87 before being removed from the trough. It is obvious that means could be provided for clamping the units together longitudinally of the trough with suitable spaces between them if this were desirable, and it is not thought necessary to illustrate this feature.

Having arranged the punch units in the machine in suitably spaced relation the next step is to place a rule on the machine for punching. It is sometimes necessary to punch a number of rules exactly similar one to the other for use in making up a form, and in any event the piece of rule to be punched must be properly positioned longitudinally of the row of punches so that the rule receiving openings shall be properly placed relatively to the ends of the rule. For this purpose there is provided a stop projection 97 secured on one end of a longitudinally slidable bar 98 arranged in front of the slug rest 9 and guided by the front edge 99 of same. The stop 97 projects over the top of the slug rest in position to engage one end of a rule 100 laid on the rest. The bar 98 is adapted to be clamped tightly in any adjusted position by means of a centrally arranged clamp comprising a hooked plate 101 and a clamping screw 102 operable in an obvious manner. The projection or abutment 97 is T-shaped so that the bar 98 can be reversed as to position to place the stop at the right hand instead of at the left hand as shown.

In adjusting the stop 97 any suitable means can be employed, one such means being to lay a printing slug, with which the rules to be punched are to be used, in position on the rule support before the row of punches in proper registry therewith. For this purpose the central line 49' on the front edge of each punch housing formed by the meeting edges of the turned in edge portions 49 forms a centering indication. After the printing slug has been thus set the bar 98 is adjusted to bring the stop against the adjacent end of the slug and then the bar is secured by the clamp 101. Then the rule pieces to be punched can be properly registered with the punches by being placed in contact with the stop 97.

It is to be noted that our machine is particularly adapted for punching rule receiving openings in extra long strips such as that shown in dotted lines in Figure 1 at 100'. For instance, if a printing form is being made up even 24" wide the punches can be arranged and the stop 97 set for punching one-half the length of the strip, and then the stop 97 can be changed to the other end of the machine and the punches arranged to punch the other end of the strip. This arrangement is made possible by keeping the end posts 2 and 3 back out of the way so that there is free space provided for the overhanging parts of the strip when one end is being punched.

The next operation is to engage the punch operator 22 with the aligned punches. The several movements and positions of the punch operator are illustrated in Figures 6 to 11 inclusive. As hereinbefore explained, the operator is adapted to be moved bodily forward and back and it can also be swung up and down on the rod 24 as a bearing by means of the handles. In the turning of the eccentric bearings 26 and 27 through 180° from one position to the other the rod 24 is swung down below its limiting positions, and this swinging down has an important function in the engaging of the punches 51.

The edge of the operator which is presented to the punches is provided with a longitudinal groove 103 of a height to receive the projections 66 at the upper ends of the punches 51. Normally when the operator is engaged with the punches it holds them in raised position with their lower punching ends drawn up above the notches 46 and ready to be depressed to punch the rules. As the punches, when disengaged, are dropped down and normally, when engaged, are raised, it is necessary to cause the groove 103 of the operator to register with the projections in the beginning of the engaging movement and to raise the punches as the engaging operation is completed. To normally hold the front edge of the operator raised there is a pull spring 104 which extends between the rear edge of the operator and the base and tends to hold the operator with the front edge raised. This spring is so arranged that it only comes into operation when the operator is swung down nearly to operative position. As has been explained, the operator can be swung up to a position where the handles 23 stand substantially vertical and we arrange the spring so that this extreme movement can be had without cramping it. This arrangement consists in securing the lower end of the spring to a vertically swinging link 105. This link can swing freely down as the operator is raised and when the operator is swung down the link is lifted until stopped by a stop shoulder 106 on the base, after which the spring comes into action. The upper end of the spring is hooked to the rear edge of the operator through the medium of a looped staple 107 secured to and projecting from the rear edge of the operator.

We arrange positive means for causing the operator to register with the punches and the arrangement is such that as soon as the operator is engaged with the punches sufficient to lift them the spring 104 operates to swing the front edge of the operator up and lift the punches. This control of the operator consists of a stop pin projecting horizontally and longitudinally of the operator at its right hand end and in the plane of the post 3. The pin 108 is arranged near the rear edge of the operator that is on the opposite side of the operator from the handles 23. As shown at 109 in Figure 8, the post 3 is cut away below the bearing to permit it to swing down and in when the operator is swung up to permit the removal and placement of the punch units, the pin 108 being adapted to strike the wall 110 at the inner end of the cut away portion to limit the rearward swinging of the handles 23, as shown in dotted lines, Figure 8. As shown in full lines in said figure, the post 3 is provided with a fixed stop 111 arranged above the position of the pin 108, when the operator is in its rearward or disengaged position, and which limits the downward swinging of the forward edge of the operator and prevents the possible forcible depression of the forward edge of the operator upon the punches and thus preserves them against possible destruction. The normal setting of the operator when in its rearward position is shown in Figure 8, in which position the stop 108 is slightly below the stop surface 111 and slightly to the rear of the rear edge 112 of the post 3. In horizontal alignment with the stop 111 there is provided a recess 113 into which the stop pin 108 enters as the eccentric bearings are rotated to move the operator forward into engagement with the punches. The wall 112 is provided with a rounded cam surface 114 which the pin 108 is adapted to engage as the operator is moved forward. This cam surface forces the pin up and consequently the forward edge of the operator down against the action of the spring 104 and the bottom wall 115 of the recess 113 is so arranged that as the operator is moved forward the groove 103 is brought to register with the projections 66 on the punches. It will be understood that this action is caused by the swinging downwardly of the bearing rod 24 in the rotation of the eccentric bearing members during the first half of such movement. During the latter half of such movement the bearing rod is raised and the forward edge of the operator rises, due to the pull of the spring 104 thus lifting the punches to their upper positions. To permit the operator to be swung down freely when in its forward position the recess 113 has an upward extension 116 at its inner end permitting the stop 108 to swing up a limited distance when the operator is depressed to punch the rules. The limitation in this last movement by the stop 108 is sufficient to prevent any undue strain on the stop projections 67 of the punches.

Sometimes it is desirable to move the whole series of punches along in the machine a certain definite amount in printer's measure, and for this purpose the screw 82 has a certain pitch so that each revolution of the screw will move it bodily longitudinally a certain distance, such for instance, the screw is preferably made with 24 threads per inch and the periphery of the screw head, as shown at 86, is divided into three parts. Consequently each division of the head represents one point, printer's measure, and four complete revolutions of the screw will move it longitudinally 12 points or one pica. It will now be clear that if the punch units are unclamped the whole series could be readily changed longitudinally in the machine a definite distance. This is of advantage in making up some forms where rules are desired spaced from each other, as in the production of pairs of parallel lines.

In Figures 30 to 37 we have illustrated a means for providing the rule holding openings where it is impossible or undesirable to provide or use full height members, such as the rules 57 or non-printing members 72, which are full height and arranged between other full height members. To meet this situation we provide projections 117 on the top surface of a printing slug 118 in the blank spaces between the printing characters 119. These projections are cast solid, that is, without rule holding openings, and are later punched in the machine similar to the punching of the holes in the other rule holding members. Preferably these rule holding projections are shorter than the blank spaces upon which they are cast and are preferably arranged at one edge of the top of the slug so that they can be entered into the punches, as before explained, with the top surface of the slug in contact with the surfaces 47 of the punch holders. This is for the reason that these projections are not type high, as then they would produce undesired impressions on the paper in printing.

As these projections are but slightly less than type high in order to afford a proper grip on the rule, their top edges 120 may be forced upwardly in the punching operation and thus produce parts which would cause undesired spots on the paper being printed. In order to avoid such deformation of the projections in the punching operation, we preferably form the projections with slight hollows or depressions 121 which are formed at the point at which the projections are to be punched. These depressions relieve the punches and avoid the deformation of the upper edges of the projections above mentioned.

For producing such projections we provide matrices 122 of the general form used in such machines for producing such slugs and provided with a notch 123 in its operating edge of the proper shape to produce the projection desired. That is, it is preferably a V-shaped notch having a rounded projection or hump 124 in its bottom and of the proper shape to produce the depression 121 in the projections 117.

As many modifications of our invention will readily suggest themselves to one skilled in the art, we do not limit or confine our invention to the specific details of construction, arrangement and operation herein shown and described.

We claim:

1. The herein described method of preparing rule holding members for printing forms, which consists in assembling a line of suitable matrices with which to cast printing bars having blank spaces interposed between printing portions, the line of matrices having blank matrices for producing said blank spaces, replacing the blank matrices with punch units of equal thickness, arranging the line of matrices with the punch units therein and punching a rule holding member with the punch units thus disposed, whereby rule holding openings are produced in the rule holding member adapted to register with the blank spaces on the said printing bars when they are properly assembled in a printing form.

2. The herein described method of preparing rule holding members for printing forms, which consists in assembling a line of suitable matrices with which to cast printing bars having blank spaces interposed between printing portions, the line of matrices having blank matrices for producing said blank spaces, replacing the blank matrices with punch units of equal thickness, arranging the line of matrices with the punch units therein, setting a stop in relation to the line of matrices by means of a printing member cast from said line of matrices and using the stop so set to set a rule holding member in relation to the line of matrices so held and punching the rule holding member with the punch units thus disposed, whereby rule holding openings are produced in the rule holding member adapted to register with the blank spaces on the said printing bars when they are properly assembled in a printing form.

3. In a machine of the kind described, a series of punch units spaced apart and clamped in upright position, each unit comprising a rigid holder and a punch movable up and down in the holder, the punch provided with a rearwardly extending projection at its upper end, a punch operator on the machine movable up and down and having a part adapted to be pressed down upon the upper end of the punch to force the punch down, and provided with a ledge below its top for engagement beneath the rearwardly extending projection on the punch for lifting same, said operator being bodily movable forward and back for engaging and disengaging the punch, said operator arranged to be swung up away from the punch when disengaged from same to permit the convenient adjustment of the punch unit in the machine.

4. In a machine of the kind described, a plurality of identical and independent punch units spaced apart by matrices which have previously been arranged for casting a printing bar for tabular work, the punch units having forwardly extending projections at their lower ends for entering beneath an overhanging part on the machine for assisting in retaining the punch units in place, the opening for said projections which is defined by said overhanging part of the machine being of less height than the similar projections on the associated matrices for the purpose of forcing the matrices rearwardly relatively to the punch units, as and for the purpose specified.

5. In a machine for punching rule receiving openings in rules and similar printing elements having top shoulders, a plurality of punch units spaced apart and clamped rigidly in place, a work receiving surface arranged in front of the punch units upon which the element to be punched can be supported, each punch unit provided with a guide surface coincident with the part of the punch which cuts through the top of the rule against which guide surface the top shoulder of a rule to be punched can be placed in the punching operation.

6. In a machine for punching rule receiving openings in rules and similar printing elements, a plurality of punch units spaced apart and clamped rigidly in place, a work receiving surface arranged in front of the punch units upon which the element to be punched can be supported, each punch unit provided with a guide shoulder coincident with the side of the punch which cuts the bottom side of the opening and against which the usual top shoulder on a rule to be punched can be placed in the punching operation.

7. In a device of the kind described, a punch holder adjustable along a support and clamped in position, a punch movable freely up and down in the holder and freely removable from the holder, the upper end of the punch provided with a rearwardly extending projection for entering a longitudinal slot in a punch operator for movement up and down thereby.

8. In a machine of the kind described, a plurality of punch units adjustable along a line for variously spacing openings in rule holding elements, means for rigidly clamping the units in their adjusted positions, each unit including a vertically movable punch having a rearwardly extending projection at its upper end, a punch operator mounted for movement up and down and provided with a longitudinal groove for receiving the projections on the several punches and means for bodily moving the operator backwards and forwards to simultaneously free the several punches and to engage them.

9. In a machine of the kind described, punch units adjustable along a line for variously spacing openings in rule holding elements, means for rigidly clamping the units in their adjusted positions, each unit including a vertically movable punch having a rearwardly extending projection at its upper end, and a punch operator mounted for movement up and down and provided with a longitudinal groove for receiving the projections on the punches, the operator being mounted, at its ends, in eccentric bearing members adapted to be rotated bodily to move the operator back and forth to simultaneously engage and disengage the several punches, as and for the purpose specified.

10. In a machine of the kind described, punch units adjustable along a line for variously spacing openings in rule holding elements, means for rigidly clamping the units in their adjusted positions, each unit including a vertically movable punch having a rearwardly extending projection at its upper end, a punch operator mounted for movement up and down and provided with a longitudinal groove for receiving the projections on the punches, the operator mounted, at its ends, in eccentric bearing members adapted to be rotated to bodily move the operator back and forth, and stop means for limiting the rotation of the eccentric bearing members in both directions, as and for the purpose specified.

11. In a machine of the kind described, punch units adjustable along a line for variously spacing openings in rule holding elements, means for rigidly clamping the units in their adjusted positions, each unit including a vertically movable punch having a rearwardly extending projection at its upper end, a punch operator mounted for movement up and down and provided with a longitudinal groove for receiving the projections on the punches, the operator mounted, at its ends, in eccentric bearing members adapted to be rotated to bodily move the operator back and forth, and means for causing the longitudinal groove in the operator to register with the punch projections as the operator is moved forward to engage same, as and for the purpose specified.

12. In a machine of the kind described, having individual punch units placed at selected intervals along a line, an operator for the punches pivotally mounted for movement up and down, stop means for preventing the operative edge of the operator being swung down to its lower operative limit when free of the punches, means for moving the operator forward and back, means normally holding the operator at the upper limit of its movement, said forward and back moving means operating as the operator is moved forward to first swing the operator down for engagement with the punches and then swing it up to lift the punches.

13. In a machine of the kind described, having individual punch units adapted to be placed at selected intervals along a line, an operator for the punches pivotally mounted for movement up and down, stop means for preventing the operative edge of the operator being swung down to its lower operative limit when free of the punches, eccentric means for moving the operator forward and back and cooperating stop means on the operator and frame of the machine, yielding means normally retaining the operator at the upper limit of its movement, said stop means and eccentric moving means operating as the operator is moved forward to first cause the depression of the forward edge of the operator for engagement with the punches and then to lift said forward edge and punches to the upper limit of the punches.

14. In a machine of the kind described, a pivotally mounted operator, a series of punches for engagement by the operator, the operator movable forward and back for engagement with and disengagement from the punches, and cooperating stops on the operator and the frame of the machine for limiting the up and down movements of the operator while engaged with the punches.

15. In a machine of the kind described, a pivotally mounted punch operator, the operator movable into engagement with and disengagement from a series of punches, stops limiting the up and down movement of the operator while in engagement with the punches and permitting a swinging up of the operator out of the path of the punches when free therefrom, a pull spring for normally holding the operator at the upper limit of its movement, and a connection between the spring and the frame permitting the free dropping of the spring as the operator is raised from its normal working position.

16. A punch unit of the kind described, having a body and a punch movable therein, the side walls of the opening for the punch being formed over to close the front of the opening, as and for the purpose specified.

17. A punch unit of the kind described, comprising a body having a central groove cut in its forward edge, the free edge portions of the sides formed in to close the front of the slot, as and for the purpose specified.

18. A punch unit of the kind described, comprising a body portion having a longitudinal punch opening in its forward edge, the side walls of the body formed in to meet substantially at the middle line of the opening and the meeting edges of the formed over parts defining the transverse center of the punch.

19. In a machine of the kind described, a plurality of punch units arranged in a line and interspersed with spacing blocks, a screw arranged at the end of the line for adjusting the line in the machine, the pitch of the screw being related to printer's measure in a definite relation, as and for the purpose specified.

20. In a machine of the kind described, a plurality of punch units arranged in a line and interspersed with spacing blocks, a screw arranged at the end of the line for adjusting the line in the machine, the pitch of the screw being definitely related to printer's measure and indicating means related to the screw for assistance in adjusting the line.

21. In a machine of the kind described, a platform upon which a rule may be laid for punching, and a removable top on the platform by which the platform may be varied as to height for accommodating slugs having projections on their tops adapted to be punched for receiving rules, the projections being set in from a side face of the slug.

22. A punch for making triangular openings in the upper edge portions of rules and comprising a thin flat, elongated member having a V-shaped sharp rear edge, and the forward portion of the lower end of the punch cut away to the base of the triangular shaped portion to form a working point.

23. In a machine of the kind described, means for clamping a series of movable punch units, comprising a fixed shoulder and an opposed movable member, said member being pivotally mounted to swing from and toward the fixed shoulder, and cam means for moving the member toward the fixed shoulder and holding it in clamping position.

24. In a machine of the kind described, a punch operator which is pivotally mounted to swing up and down to operate the punches, eccentric bearings for the operator adapted to be rotated back and forth through substantially 180° to move the operator into and out of engagement with the punches, stop means for positively limiting the circumferential adjustment of the eccentric bearings, and yielding stops for accurately setting the bearings at limiting positions.

25. The herein described method of setting a line of punch units to correspond with a previously determined spaced relation which consists in setting the several punch units in a temporary holder in proper alignment with each other, adjusting the several units from and toward each other to correspond with an associated previously prepared guide, then clamping all of the units to a rigid carrying member for transportation to a suitable machine for use.

26. In combination with a machine of the kind described, a plurality of punch units, each comprising a housing and a punch operable in the housing, a rigid carrier upon which the several punch units are removably mounted, means for securing the punch units on the carrier in proper spaced relation, said carrier with the punch units being capable of being placed as an entity in the machine and removed therefrom.

27. A punch unit for use in mechanism of the kind described and comprising a flat body adapted to be clamped in vertical operative position, the body having a vertically extending punch guide opening near its forward edge, a punch member movable up and down in said opening, a double-stepped notch in the forward edge of the body intersecting said opening the lower end of the punch formed to traverse the inner part of said notch, said notch adapted to receive the edge of type rule and serve as an aligning gauge for the shoulder of said type rule.

28. A punch unit for use in mechanism of the kind described and comprising a flat body adapted to be clamped in vertical operative position, the body having a vertically extending punch guide opening near its forward edge, a punch member movable up and down in said opening, a double-stepped notch in the forward edge of the body intersecting said opening the lower end of the punch formed to traverse the inner part of said notch, said notch adapted to receive the edge of type rule and serve as an aligning gauge for the shoulder of said type rule, the lower surface of said notch inclined and adapted to serve as a support for the part of the rule which is to be punched.

29. In a machine for perforating horizontal printing rules, means for holding a plurality of punching units in alignment and with their edges in the same horizontal plane, a work supporting bar adjacent and parallel to the cutting edges of said units, a shim on said bar and means permitting the interchangeability of the shim to vary the height of the rule and for aligning the rules to be punched by said punching units.

In testimony whereof, we have hereunto set our hands, this 27th day of February, 1925.

WILLIAM C. HOLLISTER.
LEO M. CHAPMAN.